(12) United States Patent
Morikawa

(10) Patent No.: US 8,737,612 B2
(45) Date of Patent: May 27, 2014

(54) BROADCAST RECEIVING DEVICE FOR RECEIVING BROADCAST SIGNAL AND METHOD OF CONTROLLING THE SAME

(75) Inventor: Kenichi Morikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 12/537,064

(22) Filed: Aug. 6, 2009

(65) Prior Publication Data

US 2010/0034378 A1  Feb. 11, 2010

(30) Foreign Application Priority Data

Aug. 8, 2008  (JP) .................................. 2008-206391

(51) Int. Cl.
*H04N 1/44*  (2006.01)
*H04N 7/167*  (2011.01)

(52) U.S. Cl.
USPC ............. 380/212; 380/234; 380/239; 725/25; 725/40

(58) Field of Classification Search
CPC ............ H04N 7/1675; H04N 21/4623; H04N 21/4405; H04N 21/4181; H04N 21/2347; H04N 21/4627; H04N 21/43853; H04N 21/47202; H04N 21/6143; H04N 21/6334; H04N 2005/91364; H04N 21/236; H04N 21/2368
USPC ............. 380/200–203, 210–213; 725/37–61; 348/570, 731, 733, E7.034, E5.097, 348/E5.099, E5.104, E5.105; 386/291, 297
See application file for complete search history.

(56) References Cited

U.S. PATENT DOCUMENTS

| | | | | |
|---|---|---|---|---|
| 7,920,703 | B2 * | 4/2011 | Candelore | 380/210 |
| 7,929,697 | B2 * | 4/2011 | McNeely et al. | 380/239 |
| 7,930,712 | B1 * | 4/2011 | Joseph et al. | 725/31 |
| 8,031,870 | B2 * | 10/2011 | Hong et al. | 380/239 |
| 2002/0001386 | A1 * | 1/2002 | Akiyama | 380/201 |
| 2002/0009283 | A1 * | 1/2002 | Ichioka et al. | 386/46 |
| 2004/0052379 | A1 * | 3/2004 | Nishimoto et al. | 380/281 |
| 2004/0181800 | A1 * | 9/2004 | Rakib et al. | 725/25 |
| 2006/0075423 | A1 * | 4/2006 | Brique et al. | 725/25 |
| 2006/0126839 | A1 | 6/2006 | Koike | |
| 2007/0242829 | A1 * | 10/2007 | Pedlow, Jr. | 380/277 |
| 2008/0094521 | A1 * | 4/2008 | Chang | 348/732 |
| 2009/0199283 | A1 * | 8/2009 | Jain | 726/7 |
| 2011/0285914 | A1 * | 11/2011 | Lee et al. | 348/720 |

FOREIGN PATENT DOCUMENTS

| | | |
|---|---|---|
| JP | 11-205705 A | 7/1999 |
| JP | 2003-111053 A | 4/2003 |
| JP | 2006-135589 A | 5/2006 |
| JP | 2008-141350 A | 6/2008 |

* cited by examiner

*Primary Examiner* — Gilberto Barron, Jr.
*Assistant Examiner* — Abdulhakim Nobahar
(74) *Attorney, Agent, or Firm* — Canon USA, Inc. IP Division

(57) ABSTRACT

Provided is a broadcast receiving device including a determining unit configured to make a determination on a channel selected by a selecting unit as to whether the corresponding encryption key is available or unavailable, and a control unit configured to, when the determining unit determines that the encryption key is unavailable, allow the selecting unit to sequentially select channels displayed in a channel window, allow the determining unit to make the determination, and allow an output unit to generate and output the channel window so that the channel with the encryption key determined as unavailable is identified.

10 Claims, 9 Drawing Sheets

FIG. 4

| | CH1 | CH2 | CH3 | CH4 | CH5 |
|---|---|---|---|---|---|
| 3:00 P.M. | Program 1_A | Program 2_A | Program 3_A | Program 4_A | Program 5_A |
| 4:00 P.M. | Program 1_B | Program 2_B | Program 3_B | Program 4_B | Program 5_B |
| 5:00 P.M. | Program 1_C | Program 2_C / Program 2_D | Program 3_C | Program 4_C | Program 5_C |
| 6:00 P.M. | Program 1_D | Program 2_E | Program 3_D | Program 4_D / Program 4_E | Program 5_D |
| 7:00 P.M. | Program 1_E | Program 2_E | Program 3_E | Program 4_C | Program 5_E |

Selected Channel

Work-key Unset Error: Please wait (it may take up to N seconds for each channel).

FIG. 5

| | CH1 | CH2 | CH3 | CH4 | CH5 |
|---|---|---|---|---|---|
| 3:00 P.M. | Program 1_A | Program 2_A | Program 3_A | Program 4_A | Program 5_A |
| 4:00 P.M. | Program 1_B | Program 2_B | Program 3_B | Program 4_B | Program 5_B |
| 5:00 P.M. | Program 1_C | Program 2_C / Program 2_D | Program 3_C | Program 4_C | Program 5_C |
| 6:00 P.M. | Program 1_D | Program 2_E | Program 3_D | Program 4_D / Program 4_E | Program 5_D |
| 7:00 P.M. | Program 1_E | Program 2_E | Program 3_E | Program 4_C | Program 5_E |

Selected Channel

Work-key Unset Error: Please wait (it may take up to N seconds for each channel).

FIG. 6

| | CH1 | CH2 | CH3 | CH4 | CH5 |
|---|---|---|---|---|---|
| 3:00 P.M. | Program 1_A | Program 2_A | Program 3_A | Program 4_A | Program 5_A |
| 4:00 P.M. | Program 1_B | Program 2_B | Program 3_B | Program 4_B | Program 5_B |
| 5:00 P.M. | Program 1_C | Program 2_C / Program 2_D | Program 3_C | Program 4_C | Program 5_C |
| 6:00 P.M. | Program 1_D | Program 2_E | Program 3_D | Program 4_D / Program 4_E | Program 5_D |
| 7:00 P.M. | Program 1_E | Program 2_E | Program 3_E | Program 4_C | Program 5_E |

Selected Channel

Receiving Error: Programs are not viewable for some reason.

FIG. 7

| | CH1 | CH2 | CH3 | CH4 | CH5 |
|---|---|---|---|---|---|
| 3:00 P.M. | Program 1_A | Program 2_A | Program 3_A | Program 4_A | Program 5_A |
| 4:00 P.M. | Program 1_B | Program 2_B | Program 3_B | Program 4_B | Program 5_B |
| 5:00 P.M. | Program 1_C | Program 2_C / Program 2_D | Program 3_C | Program 4_C | Program 5_C |
| 6:00 P.M. | Program 1_D | Program 2_E | Program 3_D | Program 4_D / Program 4_E | Program 5_D |
| 7:00 P.M. | Program 1_E | Program 2_E | Program 3_E | Program 4_C | Program 5_E |

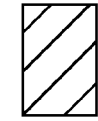 Selected Channel

 Receiving Error: This receiving device is revoked by broadcast station.

BROADCAST RECEIVING DEVICE FOR RECEIVING BROADCAST SIGNAL AND METHOD OF CONTROLLING THE SAME

BACKGROUND OF THE INVENTION

1. Field of the Invention

The present invention relates to a broadcast receiving device for receiving a broadcast signal and a method of controlling the broadcast receiving device.

2. Description of the Related Art

In digital terrestrial broadcasting, scrambled video content is transmitted. Video content scrambling is performed using a conditional access system (CAS). Currently, a BS conditional access system (B-CAS) using an IC card is in operation.

Methods of protecting video content (especially, content copyrights) in broadcast receiving devices are called "rights management and protection (RMP)". The RMP methods include a method of encrypting video content using an encryption key. For example, in the currently used B-CAS, three kinds of encryption keys, i.e., a scramble key, a work key, and a master key are used in a hierarchical manner (refer to the standard ARIB STD B-25 Ver. 5.1).

In "Part 3: Reception Control System (Content Protection System)" in the standard ARIB STD B-25 Ver. 5.1, a new content protection system (hereinafter, referred to as "new RMP system") is standardized. In the new RMP system, three kinds of encryption keys, namely, a scramble key, a work key, and a device key are used in a hierarchical manner.

According to the new RMP system, each operating broadcast station transmits an entitlement management message (EMM) for work key setting and an entitlement control message (ECM) for scramble key transmission to a broadcast receiving device at predetermined intervals.

In this instance, each EMM is data carrying information specific to the broadcast receiving device. The EMM includes ID (device ID) to identify the broadcast receiving device and a work key to decode the corresponding ECM.

Each ECM is data carrying information common to all broadcast receiving devices. The ECM includes a scramble key to decode video content, and program information.

The ECM is encrypted using the work key which varies from one RMP entity to another. The EMM is encrypted using the device key which varies from one device ID to another. The broadcast receiving device receives the EMM, which the device should receive and which is periodically transmitted, and sets the work key. To view a program, the broadcast receiving device receives and processes the ECM to acquire the scramble key and then descrambles video content.

In the new RMP system, if the operation of the system is significantly affected by, for example, the appearance of an unauthorized broadcast receiving device manufactured without a license from an RMP management center, a measure called "revocation" is performed. In revocation, device keys and work keys are updated. In this instance, each authorized broadcast receiving device can acquire the updated device key and work key but the unauthorized broadcast receiving device cannot acquire the updated keys. Accordingly, the unauthorized broadcast receiving device cannot descramble video content.

An EMM for a broadcast receiving device having certain device ID is broadcasted at regular intervals. If the device keys and the work keys are updated, therefore, it may take considerable time between the start of receiving a broadcast signal and acquisition of the work key in the broadcast receiving device. Disadvantageously, the broadcast receiving device cannot play video content back until the device acquires the work key. A user is therefore fallen into a program unviewable state where the user cannot view a program.

In consideration of the above-described problems, there is proposed a method of connecting a broadcast receiving device to a network, acquiring a detailed message from a server upon occurrence of a work-key unset error (when a necessary work key does not exist), and displaying the message in an on-screen display (OSD) manner. Japanese Patent Laid-Open No. 2006-135589 discloses such a method.

The method disclosed in Japanese Patent Laid-Open No. 2006-135589 does not specially take a work key acquiring procedure into consideration. Disadvantageously, the method does not respond to user demands to get out of the program unviewable state as soon as possible.

SUMMARY OF THE INVENTION

In consideration of the above-described situation, the present invention provides a technique of reducing time during which a program that a user intends to view is unviewable in a broadcast receiving device.

According to an aspect of the present invention, a broadcast receiving device including a receiving unit configured to receive a broadcast signal including a plurality of channels each including video content and an encryption key necessary for decoding the video content, an output unit configured to generate and output a channel window displaying at least one of the channels, and a selecting unit configured to select one of the channels includes the following elements. A determining unit is configured to make a determination on the channel selected by the selecting unit as to whether the corresponding encryption key is available or unavailable. A control unit is configured to, when the determining unit determines that the encryption key is unavailable, allow the selecting unit to sequentially select the channels displayed in the channel window, allow the determining unit to make the determination, and allow the output unit to generate and output the channel window so that the channel with the encryption key determined as unavailable is identified.

With the above-described configuration, according to the aspect of the present invention, time during which a program that a user intends to view is in the unviewable state in the broadcast receiving device can be reduced.

Further features of the present invention will become apparent from the following description of exemplary embodiments with reference to the attached drawings.

BRIEF DESCRIPTION OF THE DRAWINGS

FIG. 4 is a diagram illustrating an electronic-program-guide (EPG) window displayed in step S206 in a case where the work-key unset error has occurred in step S203 in FIG. 2.

FIG. 5 is a diagram illustrating the EPG window displayed when the work key of a channel CH4 is normally set in a state shown in FIG. 4.

FIG. 6 is a diagram illustrating the EPG window displayed when a work key setting EMM for a channel CH1 is not received after a lapse of predetermined time or longer in a state shown in FIG. 5.

FIG. 7 is a diagram illustrating the EPG window displayed when the broadcast receiving device according to the first embodiment is revoked by a broadcast station related to the channel CH1 in the state shown in FIG. 5.

DESCRIPTION OF THE EMBODIMENTS

Embodiments of the present invention will be described below with reference to the attached drawings. The individual embodiments to be described below will be conducive to understanding various concepts from broader concepts to narrower concepts of the present invention.

The technical scope of the present invention is determined by the scope of claims of the invention and is not restricted by the following individual embodiments. All of the combinations of features described in the embodiments are not necessary for the present invention.

In the following embodiments, digital terrestrial broadcasting conforming to the new RMP system will be described as an example. Accordingly, a broadcast receiving device has a device key. A plurality of channels, included in a broadcast signal, each include an EMM and an ECM. Each EMM includes a work key as an encryption key and is encrypted by the device key. Each ECM includes a scramble key and is encrypted by the corresponding work key. Video content of each channel is encrypted by the corresponding scramble key.

The present invention is not limited to the digital terrestrial broadcasting conforming to the new RMP system. So long as the concept of video content and that of an encryption key necessary to decode video content exist, the present invention is applicable to another standard.

First Embodiment

Figure 1:
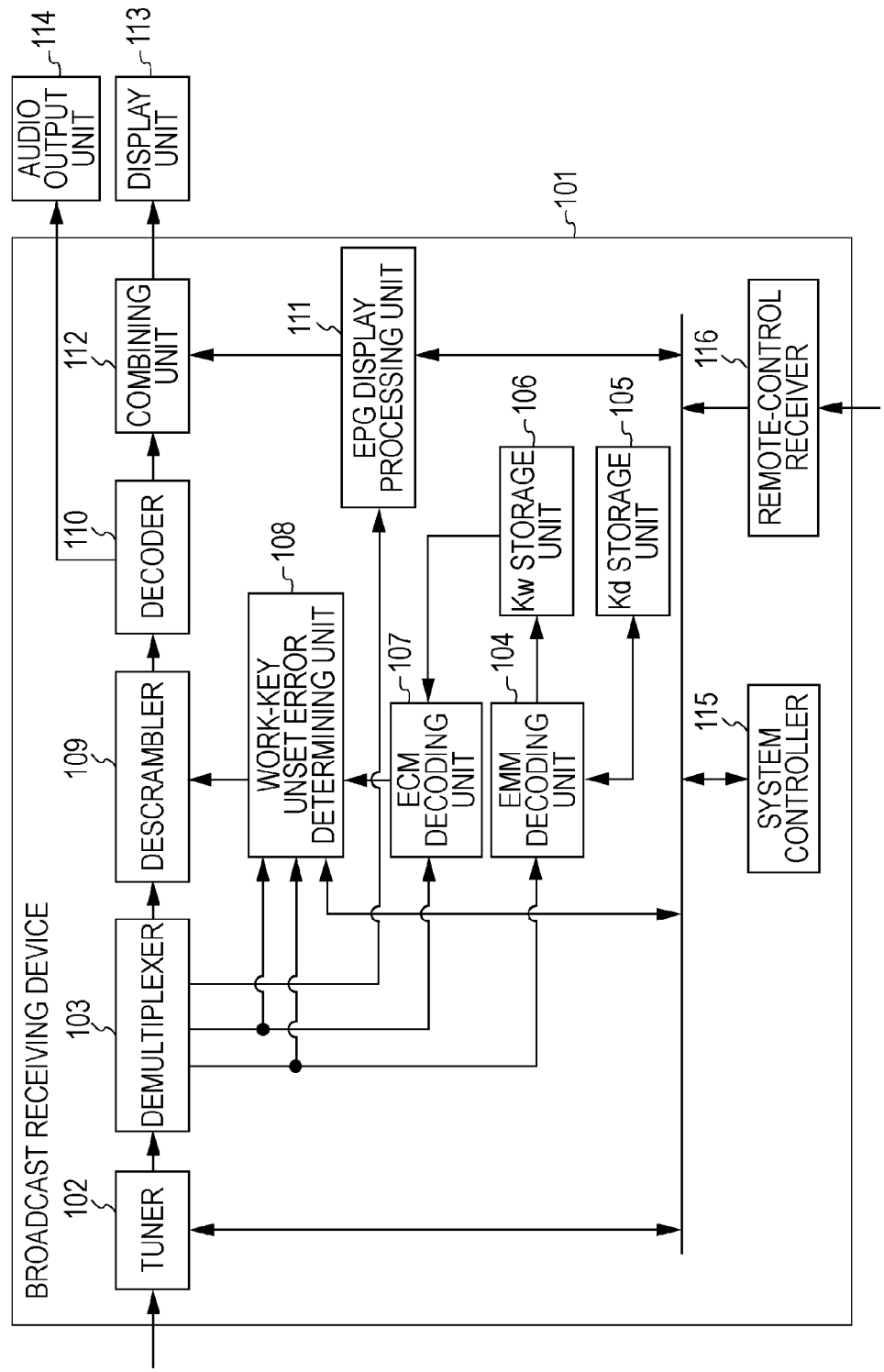
FIG. 1 is a block diagram illustrating the schematic configuration of a broadcast receiving device according to a first embodiment of the present invention.

FIG. 1 is a block diagram illustrating the schematic configuration of a broadcast receiving device 101 according to a first embodiment of the present invention.

The broadcast receiving device 101 includes a tuner 102, a demultiplexer 103, an EMM decoding unit 104, a device-key storage unit (hereinafter, "Kd storage unit") 105, a work-key storage unit (hereinafter, "Kw storage unit") 106, an ECM decoding unit 107, and a work-key unset error determining unit 108.

The broadcast receiving device 101 further includes a descrambler 109, a decoder 110, an EPG display processing unit 111, a combining unit 112, a display unit 113, and an audio output unit 114. The broadcast receiving device 101 may be, for example, a DVD recorder. In this case, the display unit 113 and the audio output unit 114 are connected to the broadcast receiving device 101 but are not included therein.

The broadcast receiving device 101 further includes a system controller 115 and a remote-control receiver 116.

The tuner 102 receives a broadcast signal through an antenna (not illustrated), selects a channel in accordance with an instruction from the system controller 115, and transmits a TS packet to the demultiplexer 103.

The demultiplexer 103 demultiplexes video data, audio data, data-broadcasting (datacasting) data, an ECM, and an EMM from the TS packet. The demultiplexer 103 refers to a program map table (PMT). When the TS packet includes an ECM, the demultiplexer 103 demultiplexes the ECM from the TS packet. The PMT describes stream (component) information about broadcast programs and the packet ID of the TS packet carrying the ECM. The demultiplexer 103 filters the device ID and associated information byte length at the header of an EMM fixed part to identify the EMM addressed to the device and then demultiplexes the EMM from the TS packet.

The EMM decoding unit 104 performs device key generation calculation on a device key updating EMM to obtain a device key and then stores the device key to the Kd storage unit 105. In addition, the EMM decoding unit 104 decodes a work key setting EMM using the device key to acquire a work key and then stores the work key to the Kw storage unit 106.

The Kd storage unit 105 is a nonvolatile memory that stores the device key.

The Kw storage unit 106 is a nonvolatile memory that stores the work key.

The ECM decoding unit 107 decodes the ECM supplied from the demultiplexer 103 using the work key read out from the Kw storage unit 106 to obtain a scramble key and outputs the scramble key to the work-key unset error determining unit 108.

The work-key unset error determining unit 108 makes a determination on the basis of information indicating whether a work-key invalid flag in the ECM is active or information indicating whether a work key identifier (odd or even) in the ECM agrees with that in the EMM. When it is determined that a work-key unset error (namely, a work-key unavailable state) does not occur, the work-key unset error determining unit 108 outputs the scramble key to the descrambler 109.

The descrambler 109 descrambles the video data and the audio data using the supplied scramble key and outputs the resultant data items to the decoder 110.

The decoder 110 decodes the descrambled video data and audio data and then outputs the decoded video data and audio data to the combining unit 112 and the audio output unit 114, respectively.

The EPG display processing unit 111 generates data regarding an EPG window on the basis of the datacasting data demultiplexed by the demultiplexer 103 and outputs the generated data to the combining unit 112. The timing of EPG window generation is determined in accordance with an instruction of the system controller 115. In the present embodiment, the EPG display processing unit 111 does not necessarily generate data regarding the EPG window. The EPG display processing unit 111 may generate data regarding a window (channel window) displaying at least one of channels included in a broadcast signal.

The combining unit 112 combines the video data supplied from the decoder 110 with the data supplied from the EPG display processing unit 111 and then outputs the resultant data to the display unit 113.

The display unit 113 displays the data supplied from the combining unit 112 on a monitor.

The audio output unit 114 outputs the audio data supplied from the decoder 110 as sound through a speaker.

The system controller 115 controls the entire broadcast receiving device 101. In addition, the system controller 115 performs power ON/OFF control or instructs the tuner 102 to select a channel in accordance with a user instruction received through the remote-control receiver 116. When the work-key unset error determining unit 108 determines that the work-key unset error has occurred, the system controller 115 instructs the EPG display processing unit 111 to start a process.

The remote-control receiver 116 receives information from a remote control, serving as a user interface, by radio. The remote-control receiver 116 notifies the system controller 115 of descriptions of the received information.

Figure 2:
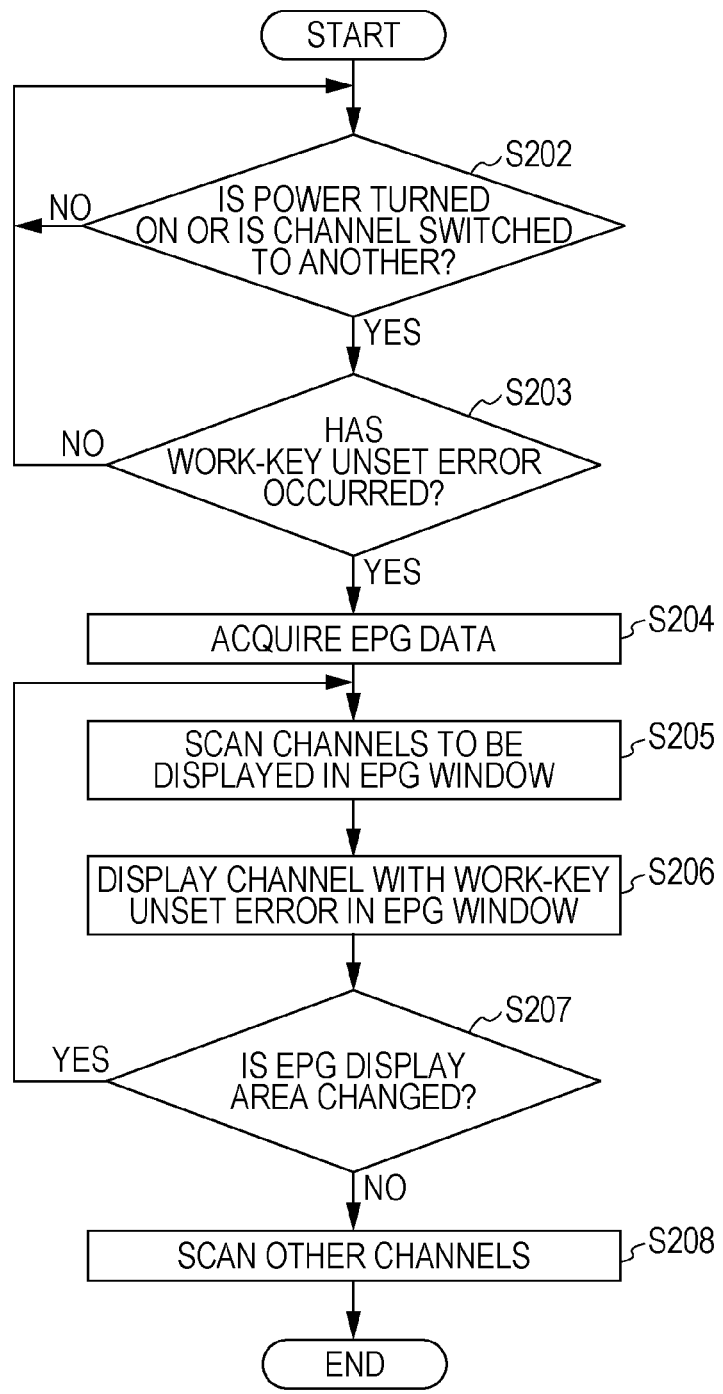
FIG. 2 is a flowchart illustrating the flow of a process executed in a case where a work-key unset error has occurred in the broadcast receiving device according to the first embodiment.

FIG. 2 is a flowchart illustrating the flow of a process performed in a case where the work-key unset error has occurred in the broadcast receiving device 101. Processes illustrated by the following flowcharts including that of FIG. 2 are achieved by executing a control program stored in a memory (not shown) through the system controller 115 or another component unless otherwise noted.

In step S202, the system controller 115 determines whether the power is turned on or a channel is switched to another in accordance with a user instruction. If the power is turned on, alternatively, the channel is switched to another, the process proceeds to step S203. If not, the determination in step S202 is repeated.

In step S203, the work-key unset error determining unit 108 determines whether the work-key unset error has occurred. If the work-key unset error has occurred, the process proceeds to step S204. If not, the process is returned to step S202.

In step S204, the EPG display processing unit 111 acquires EPG data from the datacasting data demultiplexed by the demultiplexer 103.

In step S205, the EPG display processing unit 111 sends information regarding channels to be displayed in the EPG window to the system controller 115 and the system controller 115 instructs the tuner 102 to sequentially scan the channels. The work-key unset error determining unit 108 determines on each scanned channel whether the work-key unset error has occurred and then sends information indicating a result of determination to the system controller 115.

In step S206, the system controller 115 instructs the EPG display processing unit 111 to display the EPG window so that a channel, in which the occurrence of the work-key unset error is determined in step S205, can be identified. When receiving such an instruction, the EPG display processing unit 111 generates data regarding the EPG window in which the user can identify the channel with the work-key unset error among the channels displayed in the EPG window and then outputs the generated data to the combining unit 112.

In step S207, the system controller 115 determines whether a display area of the EPG window is changed in accordance with a user instruction. If the display area is changed, the process is returned to step S205. If the display area is not changed, the process proceeds to step S208.

In step S208, the system controller 115 scans channels other than the channels displayed in the EPG window in the same way as step S205.

In this flowchart, if the user performs channel switching in midstream, channel scanning is continued. If channel switching is performed in midstream, the display of the EPG window may be terminated and the process may be returned to step S201.

Figure 3:
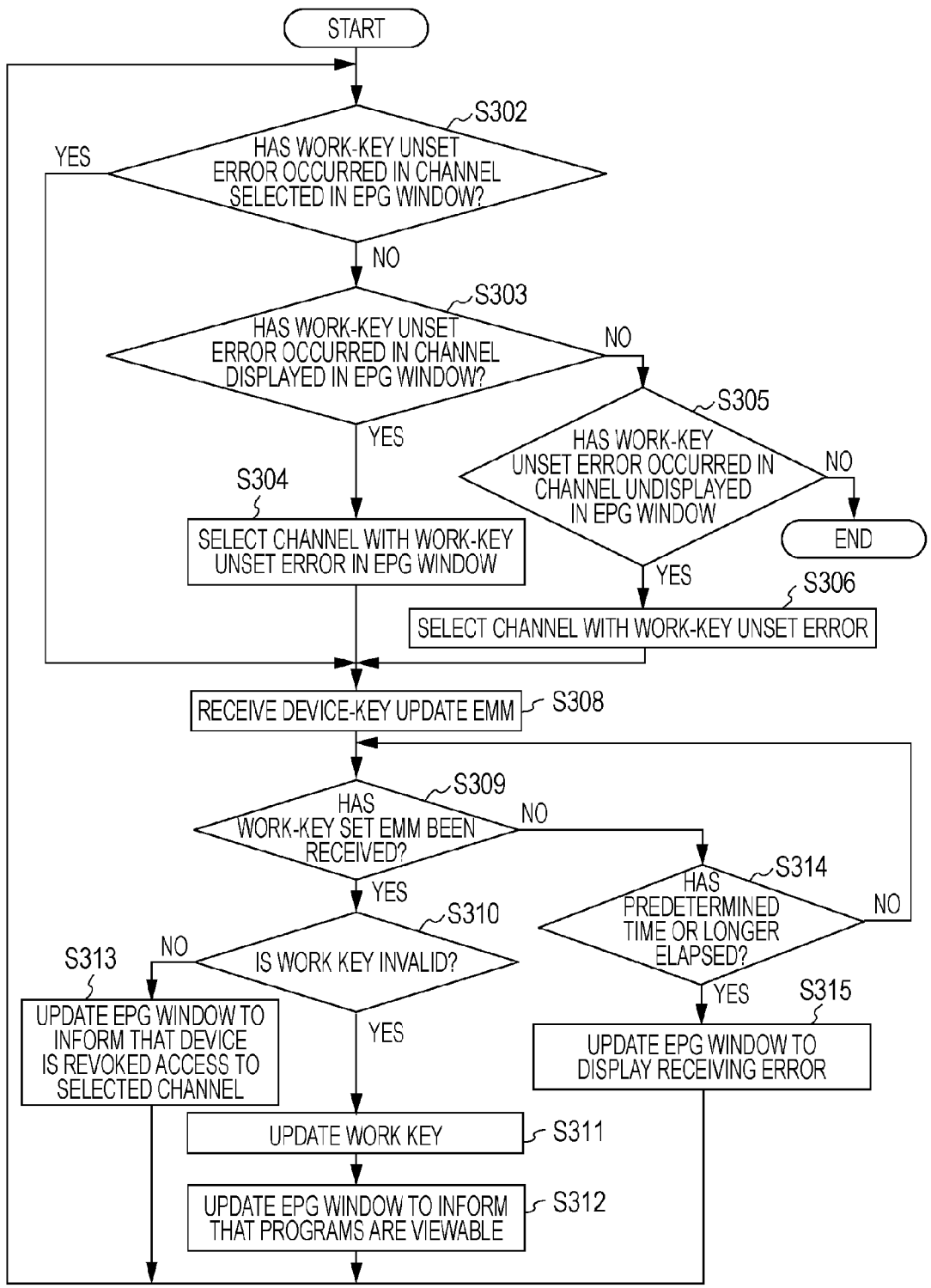
FIG. 3 is a flowchart illustrating the flow of a process of updating a device key and a work key by the broadcast receiving device according to the first embodiment.

FIG. 3 is a flowchart illustrating a process of updating the device key and the work key by the broadcast receiving device 101. The process illustrated by this flowchart may be started at the time when processing in step S205 in FIG. 2 is terminated or when processing in step S208 is terminated.

In step S302, the system controller 115 determines whether the work-key unset error has occurred in a channel selected in the EPG window. If the error has occurred, the process proceeds to step S308. If not, the process proceeds to step S303. Although processing in step S308 will be described in detail below, the work key of the channel selected in the EPG window (namely, the channel with high probability that the user will want to view) is acquired first according to conditional branching in step S302.

In step S303, the system controller 115 determines whether the work-key unset error has occurred in a channel displayed in the EPG window. If the error has occurred, the process proceeds to step S304. If not, the process proceeds to step S305.

In step S304, the system controller 115 allows the tuner 102 to select the channel in which the work-key unset error has occurred from among the channels displayed in the EPG window. The process then proceeds to step S308.

In step S305, the system controller 115 determines whether the work-key unset error has occurred in a channel that is not displayed in the EPG window. If the error has occurred, the process proceeds to step S306. If not, the process is terminated.

In step S306, the system controller 115 allows the tuner 102 to select the channel in which the work-key unset error has occurred from among the channels which are not displayed in the EPG window. The process then proceeds to step S308.

In step S308, the EMM decoding unit 104 receives a device key updating EMM in the selected channel and stores the device key in the Kd storage unit 105.

In step S309, the EMM decoding unit 104 determines whether a work key setting EMM has been received. If the EMM has been received, the process proceeds to step S310. If not, the process proceeds to step S314.

In step S310, the work-key unset error determining unit 108 refers to a work-key invalid flag in the work key setting EMM to determine whether the work key is valid. If the work key is valid, the process proceeds to step S311. if the work key is invalid, the process proceeds to step S313.

In step S311, the EMM decoding unit 104 updates the work key (namely, stores the work key in the Kw storage unit 106). The process then proceeds to step S312.

In step S312, the selected channel enters a state in which the channel can be descrambled. The EPG display processing unit 111 updates the EPG window so that the user can recognize that programs of the channel can be changed to be viewable.

In step S313, since the work key is invalid, the EPG display processing unit 111 updates the EPG window so that the user can recognize that the receiving device is revoked access to the selected channel.

In step S314, the system controller 115 determines whether predetermined time or longer has elapsed. If the predetermined time has elapsed, the process proceeds to step S315. If not, the process is returned to step S309.

In step S315, the EPG display processing unit 111 updates the EPG window so that the user can recognize a receiving error in which the reception of the EMM from a broadcast station has failed for some reason.

After each of steps S312, S313, and S315, the process is returned to step S302. Accordingly, channels in each of which the work-key unset error has occurred are sequentially selected to update the work key in accordance with the flowchart of FIG. 3.

FIG. 4 is a diagram illustrating an example of the EPG window displayed in step S206 in the case where the work-key unset error has occurred in step S203 in FIG. 2.

In this example, the EPG window shows that a channel CH4 is selected by the user and the work-key unset error has occurred in each of channels CH1 and CH4 as a result of scanning channels displayed in the EPG window. In addition, the EPG window provides the user with additional information indicating how much time is required until programs are viewable.

FIG. 5 illustrates an example of the EPG window displayed when a new work key is set in the channel CH4 by updating the work keys in order of priority from the selected channel in accordance with the flowchart of FIG. 3. Referring to FIG. 5, the EPG window shows the channel CH4 changed to a viewable state to the user. The case in FIG. 5 corresponds to step S312 in the flowchart of FIG. 3.

The following case will now be described below: While the work-key unset error has occurred as shown in FIG. 5, processing of updating the work key of the channel CH1 is tried to be performed but a work key setting EMM is not received after a lapse of predetermined time or longer. In this case, the EPG window is displayed as shown in FIG. 6. The EPG window shows a receiving error, in which programs of the channel CH1 cannot be received, to the user. This case corresponds to step S315 in the flowchart of FIG. 3.

Another case will now be described below. In this case, while the work-key unset error has occurred as shown in FIG. 5, the broadcast receiving device 101 is subjected to revocation by a broadcast station and cannot therefore acquire a valid work key. In this instance, the EPG window is displayed as shown in FIG. 7. The EPG window shows a receiving error, in which programs of the channel CH1 are not viewable due to revocation, to the user. This case corresponds to step S313 in the flowchart of FIG. 3.

The broadcast receiving device 101 may be designed so as to provide information regarding, for example, an information service appropriate for an error state in addition to information displayed in FIGS. 4 to 7 to the user.

As described above, according to the present embodiment, the broadcast receiving device 101 updates the work key of a channel selected in the EPG window first among channels in each of which the work-key unset error has occurred. Subsequently, the work key of each of the channels unselected and displayed in the EPG window is updated. After updating, the work keys of other channels are updated.

Consequently, time during which a program that the user intends to view is unviewable is reduced in the broadcast receiving device 101.

First Modification

Figure 8:
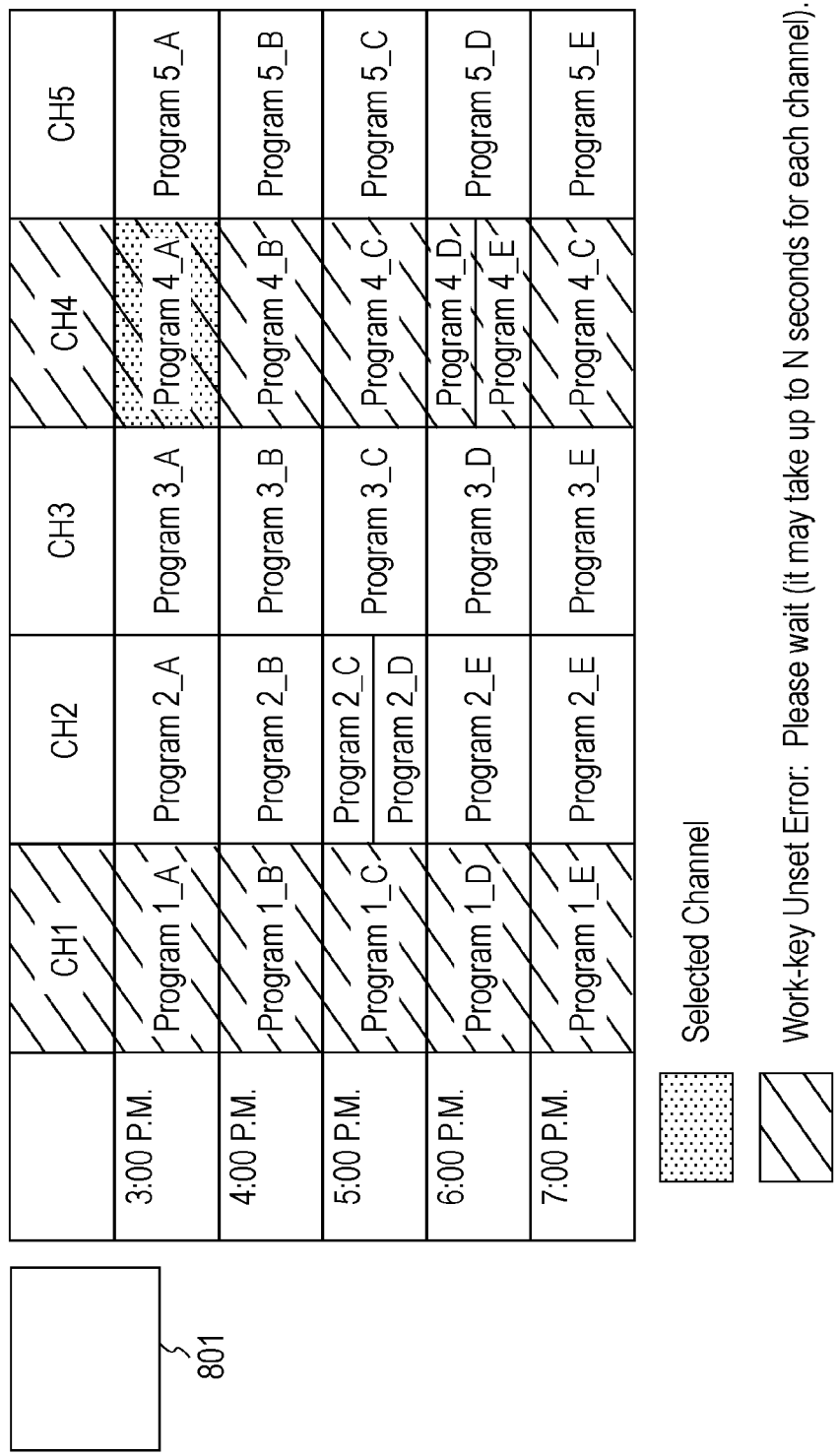
FIG. 8 is a diagram illustrating the EPG window including a subwindow for displaying video content.

A first modification of the first embodiment will now be described. In the first modification, an EPG display processing unit 111 displays a subwindow 801 for displaying video content (program video image) in an EPG window as shown in FIG. 8.

If a work-key unset error has occurred, a broadcast receiving device 101 cannot decode video content to be displayed in the subwindow 801, so that blackout occurs in the subwindow 801.

According to the first modification, the EPG display processing unit 111 displays the subwindow 801 only when the work key of a channel selected by a tuner 102 is available (namely, the work-key unset error does not occur).

Consequently, the display of the blackout subwindow 801 is prevented.

Second Modification

A second modification of the first embodiment will be described below with respect to a case where a broadcast receiving device 101 supports one-segment broadcasting (namely, the broadcast receiving device 101 is capable of receiving one-segment broadcasting). The one-segment (termed "1 seg" or "One Seg" (wansegu) in Japan) broadcasting is the name of a mobile-specific broadcasting service based on the digital terrestrial broadcasting system ISDB-T and is transmitted without being scrambled.

Figure 9:
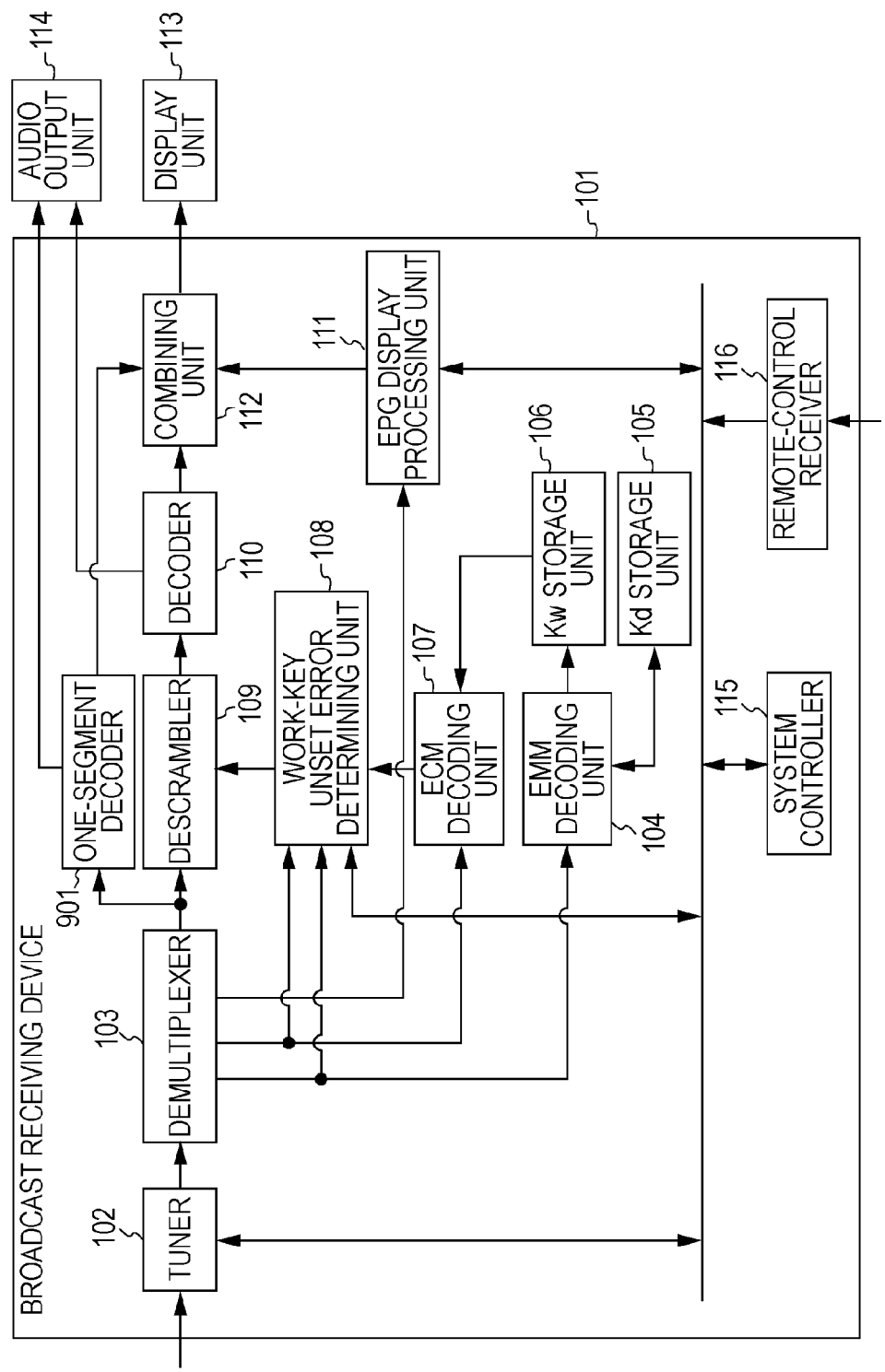
FIG. 9 is a block diagram illustrating the schematic configuration of a broadcast receiving device according to a second modification of the first embodiment.

FIG. 9 is a block diagram illustrating the schematic configuration of the broadcast receiving device 101 according to the second modification. In FIG. 9, components having the same functions as those in FIG. 1 are designated by the same reference numerals and redundant explanation is omitted. An antenna (not illustrated) receives a one-segment broadcast signal including a plurality of one-segment channels.

When receiving video data and audio data demultiplexed through a demultiplexer 103, a one-segment decoder 901 decodes one-segment broadcast data in a frequency band for one-segment broadcasting included in the video and audio data and then outputs the decoded video data to a combining unit 112 and the decoded audio data to an audio output unit 114, respectively. The combining unit 112 combines the decoded video data with data regarding an EPG window so that a subwindow 801 (see FIG. 8) displays a video image obtained by decoding the one-segment broadcast data and outputs the resultant data to a display unit 113.

Consequently, the subwindow 801 is prevented from being blackout upon occurrence of a work-key unset error.

The present invention is not limited to one-segment broadcasting, but is applicable to another mobile-specific broadcasting, e.g., MediaFLO (Forward Link Only).

Other Embodiments

To achieve the functions of the above-described embodiment and modifications, a storage medium storing a software program code for implementing the functions may be supplied to a system or an apparatus. A computer (or a CPU or an MPU) of the system or apparatus reads out and executes the program code stored in the storage medium, thus implementing the functions of the above-described embodiment and modifications. In this case, the program code itself read out from the storage medium implements the functions of the foregoing embodiment and modifications. In other words, aspects of the present invention include the storage medium storing the program code. Examples of the storage medium for supplying the program code may include a flexible disk, hard disk, optical disk, magneto-optical disk, CD-ROM, CD-R, magnetic tape, nonvolatile memory card, and ROM.

The functions of the above-described embodiments may be implemented not only by executing the read-out program code by the computer but also by allowing an operating system (OS) running on the computer to perform part or the whole of actual processing on the basis of instructions of the program code.

Furthermore, the program code read out from the storage medium may be written into a memory provided for a function expansion board incorporated in the computer, or a function expansion unit connected to the computer. In other words, the functions of the embodiment and modifications may be implemented by allowing a CPU provided for the function expansion board or the function expansion unit to perform part or the whole of actual processing on the basis of instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-206391, filed Aug. 8, 2008, which is hereby incorporated by reference herein in its entirety.

What is claimed is:

1. A broadcast receiving device including a storage unit configured to store a device key, a tuner unit configured to receive a broadcast signal including a plurality of channels each including video content, an encryption key as a work key and a scramble key for descrambling the video content, and an output unit configured to generate and output a channel window displaying at least electronic program guide (EPG) information relating to programs in a group of channels among the plurality of channels in the broadcast signal, the device comprising:

a determining unit configured to make a determination on a first channel selected and displayed on the channel window as to whether the encryption key corresponding to the selected first channel is available or unavailable; and a control unit configured to, in response to the determining unit determining that the encryption key corresponding to the selected first channel is unavailable, control the tuner unit to select each channel in the group of channels to be displayed in the channel window, control the determining unit to make the determination regarding availability of the encryption key on each channel in the group of channels, control the output unit to display the selected group of channels in the channel window, and control the output unit to generate and output the channel window so that each channel whose encryption key is determined as unavailable is identified among the group of channels displayed in the channel window; and an acquiring unit configured to acquire new encryption key and update the work key based on the new encryption key corresponding to each channel whose encryption key is determined as unavailable in the group of channels in a case where the new encryption key is available, wherein after the determination regarding availability of the encryption key on each channel in the group of channels displayed in the channel window, the control unit controls the tuner unit to select a second channel which is not displayed in the channel window, and controls the determining unit to make the determination regarding availability of the encryption key on the second channel.

2. The device according to claim 1, wherein the control unit controls the output unit to update the channel window so that a channel whose new encryption key has not been acquired or a channel whose acquired new encryption key is invalid is identified among the group of channels displayed in the channel window.

3. The device according to claim 1, wherein the determining unit makes the determination at the time when the first channel is selected in accordance with a user instruction or when the broadcast receiving device is turned on.

4. The device according to claim 1, wherein only when the encryption key of the first channel selected by the selecting unit is available, the output unit outputs a subwindow displaying the video content of the selected first channel together with the channel window.

5. The device according to claim 1, wherein
each of the plurality of channels include an entitlement management message (EMM) and an entitlement control message (ECM),
the EMM includes the encryption key as a work key, and
the ECM includes the scramble key.

6. A method of controlling a broadcast receiving device including a storage unit configured to store a device key, a tuner unit configured to receive a broadcast signal including a plurality of channels each including video content and an encryption key as a work key and a scramble key for descrambling the video content, and an output unit configured to generate and output a channel window displaying at least electronic program guide (EPG) information relating to programs in a group of channels among the plurality of channels in the broadcast signal, the method comprising the steps of:

making a determination on a first channel selected and displayed on the channel window as to whether the encryption key corresponding to the selected first channel is available or unavailable; and in response to the determination that the encryption key corresponding to the selected first channel is unavailable, controlling the tuner unit to select each channel in the group of channels to be displayed in the channel window, making the determination regarding availability of the encryption key on each channel in the group of channels, controlling the output unit to display the selected group of channels in the channel window, and controlling the output unit to generate and output the channel window so that each channel whose encryption key is determined as unavailable is identified among the group of channels displayed in the channel window;

acquiring new encryption key updating the work key based on the new encryption key corresponding to each channel whose encryption key is determined as unavailable in the group of channels in a case where the new encryption key is available; and after the determination regarding availability of the encryption key on each channel in the group of channels displayed in the channel window, controlling the tuner unit to select a second channel which is not displayed in the channel window, and controlling making the determination regarding availability of the encryption key on the second channel.

7. The method according to claim 6, further comprising updating the channel window so that a channel whose new encryption key has not been acquired or a channel whose acquired new encryption key is invalid is identified among the group of channels displayed in the channel window.

8. The method according to claim 6, further comprising making a determination at the time when the first channel is selected in accordance with a user instruction or when the broadcast receiving device is turned on.

9. The method according to claim 6, wherein only when the encryption key of the first channel is available, the output unit outputs a subwindow displaying the video content of the selected first channel together with the channel window.

10. The method according to claim 6, wherein
each of the plurality of channels include an entitlement management message (EMM) and an entitlement control message (ECM),
the EMM includes the encryption key as a work key, and
the ECM includes the scramble key.

* * * * *